US011874762B2

(12) United States Patent
Nidugala et al.

(10) Patent No.: US 11,874,762 B2
(45) Date of Patent: Jan. 16, 2024

(54) CONTEXT-BASED TEST SUITE GENERATION AS A SERVICE

(71) Applicant: Hewlett Packard Enterprise Development LP, Houston, TX (US)

(72) Inventors: Muralikrishna Nidugala, Karnataka (IN); Ravi Teja Jammulapati, Karnataka (IN); Krishnaprasad Bidare Prabhakar, Karnataka (IN); Anup Kumar Sahu, Karnataka (IN); Aryan Mehta, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 72 days.

(21) Appl. No.: 17/806,868

(22) Filed: Jun. 14, 2022

(65) Prior Publication Data

US 2023/0401144 A1     Dec. 14, 2023

(51) Int. Cl.
*G06F 11/36*     (2006.01)
*G06N 5/022*     (2023.01)

(52) U.S. Cl.
CPC ...... *G06F 11/3684* (2013.01); *G06F 11/3688* (2013.01); *G06N 5/022* (2013.01)

(58) Field of Classification Search
None
See application file for complete search history.

(56) References Cited

U.S. PATENT DOCUMENTS

| 9,898,393 B2 | 2/2018 | Moorthi et al. |
| 10,474,455 B2 | 11/2019 | Makkar |
| 10,671,355 B2 | 6/2020 | Banuelos et al. |
| 10,684,849 B2 | 6/2020 | Makkar |
| 10,705,943 B2 | 7/2020 | Makkar |
| 10,809,984 B2 | 10/2020 | Mizrahi et al. |
| 10,929,117 B2 | 2/2021 | Goldmann et al. |
| 2015/0363294 A1* | 12/2015 | Carback, III ............. G06F 8/70 717/132 |
| 2016/0350207 A1* | 12/2016 | Cmielowski ........ G06F 11/3684 |
| 2017/0039126 A1* | 2/2017 | Wood .................. G06F 11/3688 |
| 2020/0272443 A1 | 8/2020 | Fu et al. |
| 2021/0132935 A1 | 5/2021 | Dinh et al. |
| 2023/0289280 A1* | 9/2023 | Yuan ................... G06F 11/3688 717/131 |

FOREIGN PATENT DOCUMENTS

WO     2020/190392 A1     9/2020

* cited by examiner

*Primary Examiner* — Qing Chen
(74) *Attorney, Agent, or Firm* — Hewlett Packard Enterprise Patent Department

(57) ABSTRACT

A system comprising processing circuitry a memory storing instructions that cause the system to detect a code change to source code included in a code repository, identify a relationship between the code change and an associated product feature, determine one or more dependent product features impacted by the code change, select a set of test cases including a subset of test cases related to the associated product feature and a subset of test cases related to the one or more dependent product features, execute the set of test cases, and update the code-to-feature mapping using results of executing the set of test case.

20 Claims, 6 Drawing Sheets

CONTEXT-BASED TEST SUITE GENERATION AS A SERVICE

BACKGROUND

When developing source code for a complex product in a complex computing environment, developers can unknowingly introduce, perpetuate, or expose defects (e.g. "bugs", incompatibilities). Changes to the source code for one feature may impact other features or functionalities due to code dependencies between those features and functionalities. As an example, a developer who makes source code changes to a social media application to dynamically adjust a profile picture according to the sentiment of the user's last post to the social media platform (e.g. a celebratory post results in confetti being overlaid on the profile picture) may unwittingly expose a latent defect in the acquisition and display of profile pictures obtained from a third party (e.g. the cached profile picture is too low resolution for use in certain elements on the webpage, but in normal operation a higher resolution image is dynamically obtained from the third party as part of the page load process). By dynamically adjusting the low resolution cached image instead of the dynamically obtained high resolution image, the new feature degrades the profile picture. While this example is contrived to explain one way that code dependencies can cause code changes (no matter how well written) to introduce, perpetuate, or expose defects, a person having ordinary skill in the art will recognize that there are innumerable ways that source code changes could result in unexpected impacts to the application as a whole.

In the past, developers were responsible for manually managing and executing test suites to confirm that the feature worked properly (e.g. unit testing, API testing) and that the changes did not impact the overall functionality of the application (e.g. integration testing, regression testing, system testing). In order to take the testing burden out of the developers' hands, development organizations employ DevOps and Continuous Testing to automatically catalog tests, compile test suites, and execute the test suites when code is committed to the code repository.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
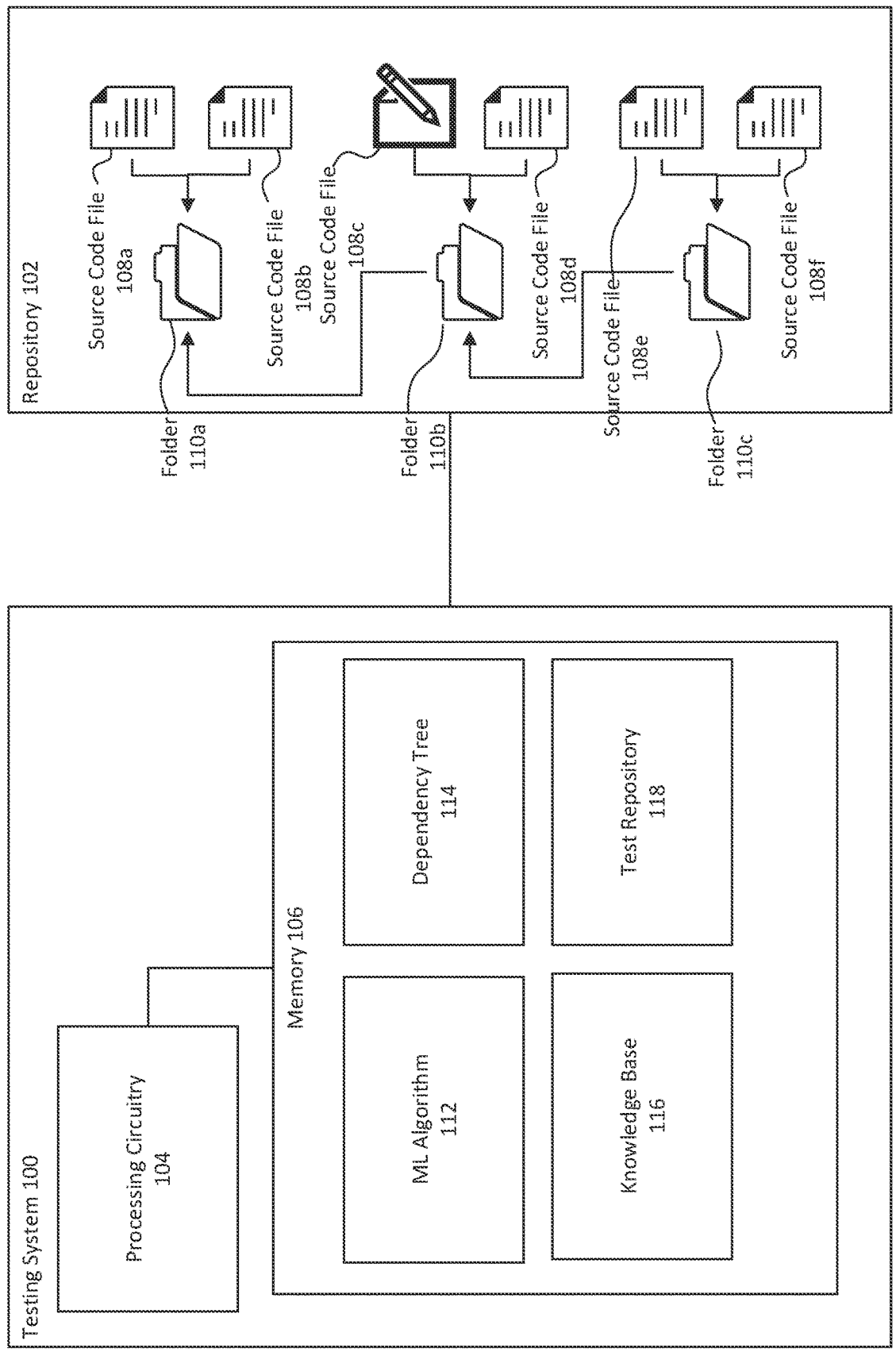
FIG. 1 illustrates an example testing system.

While DevOps, Continuous Testing and related test automation initiatives have better organized testing, improved compliance with testing policies, and broadened the scope of the test suites being executed, the testing process can still be quite manual and limited in scope. Often, the relationships between code portions, features, and test cases are manually mapped by the developers. While better than relying on each developer to individually pull together a test suite based on their code changes, relying on the developers to map the test cases and the features creates a situation where imperfect compliance (whether due to time constraints or constraints in the developer's knowledge of all of the appropriate mappings) can create testing blind spots.

In an example consistent with this disclosure, a testing system assesses code changes in relation to features of the application, identifies code dependencies for the code changes, selects and generates test cases for the test suite, executes the test suite, and analyzes the results to adjust feature mappings and dependencies. By assessing code changes in relation to the features, the testing system is able to understand the context of the code changes and identify any dependencies that exist between the feature impacted by the code changes and any other features. Then, rather than relying on developers' limited understanding of feature interactions, the system uses a machine learning (ML) algorithm to map feature interactions and dependencies through software, firmware, interfaces, kernels, libraries, etc. Rather than limiting the scope of the feature interactions to a certain codebase, the system maps feature interactions throughout the entire system at test by bridging dependencies across code bases. With a limited amount of effort and organization by the development team, the system can select a test suite accounting for the contextual impact to the system under test as a whole, and even to products that are connected to the system under test.

The system parses the codebase to extract the changes to the source code, and to identify which components are impacted. In some examples, the system uses a ML algorithm to identify the impacted components. The ML algorithm captures relationships between code, folders, features, and components based on information parsed out of characteristics of the source code, including pre-processing statements and libraries. From those relationships, the ML algorithm is able to predict which features are impacted by a particular code change. For example, the ML algorithm may incorporate information from a knowledge base of previous analyses, relationships between code, folders, features, and components, textual analysis of source code and documentation, and user input to determine the impact a code change has on various product features. Once the impact is determined, the system selects test cases relevant to the impacted product features.

As can be appreciated by a person having ordinary skill in the art, determining the impact of a change to a portion of source code can be more difficult than merely identifying which feature is associated with the portion of source code being changed. Interrelations between software features, software applications, software and firmware, software and device drivers, and even the product under test and other connected products may expose unintended functionalities and defects. The system selects not only the test cases relevant to the feature associated with the portion of the source code being changed, but also test cases relevant to other features that are interrelated with that feature.

In some examples, the system may use the relationships between test cases and features as well as between source code and features to determine that a testing gap exists. A testing gap is when insufficient tests exist to fully validate the effects of a code change to the impacted features. If a testing gap is found, the system may, with or without assistance from a user, generate additional test cases to fill that testing gap. In some examples, the testing gap is reported to a user for manual remediation.

Continuing discussion of the example, the system is a learning system. This means that the system will collect information after a testing phase is completed and apply the information to the ML algorithm to improve the system's understanding (e.g. mappings) of the underlying relationships between code, folders, features, and components. Such a learning process may be called "retraining". The system may collect information including usage of features, frequency of testing, defect hit rate, defect patterns over time, log data from test logs relating to previous execution of test cases, and configuration data and test results from the system under test. Taking this information into account, the ML algorithm improves its identification and prediction of code to feature and feature to test relationships described above.

The features described in this disclosure improve software development by automatically identifying difficult to find relationships between code, folders, features, and components that are impacted by a code change. The system reduces the manual effort required for comprehensive test selection as well as error and omissions that are commonplace when test suites are manually compiled (with or without limited automated assistance).

FIG. 1 illustrates an example testing system. Testing system 100 is coupled to a code repository 102. Testing system 100 includes processing circuitry 104 and memory 106. Processing circuitry 104 is coupled to memory 106 such that instructions fetched from memory 106 can be executed on processing circuitry 104. Memory 106 includes ML algorithm 112, decision tree 114, knowledge base 116, and test repository 118. ML algorithm 112, dependency tree 114, knowledge base 116 and test repository 118 may be stored in memory 106 as a combination of instructions and data. ML algorithm 112 may be an artificial neural network. Repository 102 includes source code files 108 organized in folders 110. Relationships between source code files 108, between folders 110, and between source code files 108 and folders 110 are represented as arrows between the related objects.

When a developer changes code in a source code file 108c, the changes in the source code may have impact on other features or components of the product, or even other products. Source code file 108c is organized in folder 110b which may contain source code for a certain product feature or component. Other folders 110a and 110c include other source code files 108a-b and 108e-f, respectively. Since source code files 108c and 108d are both contained in folder 110b, they are considered related to the feature associated with folder 110b. Dependencies also exist between the feature associated with folder 110c and the feature associated with folder 110b (represented by the arrow pointing from folder 110c to folder 110b), and likewise between the feature associated with folder 110b and folder 110a (represented by the arrow pointing from folder 110b to folder 110a). These relationships may be between features or components of a single software application, between software and firmware, software and device drivers, one component of the product and another component of the product, or even between the product and another related product. Folders 110a-c may include source code files 108 that are associated with one or more of any of those features, components, or products.

Testing system 100 detects that a change has happened to the source code in repository 102. In examples, a user of testing system 100 provides an indication that the change has happened. In some other examples, a notification is received from repository 102 (e.g. a push indication, a diff file, etc.). Testing system 100 scans repository 102 to determine the extent of the changes made to the source code. Testing system 100 may deploy a code crawler (i.e. software to systematically scan the file system of repository 102) to determine the extent of the changes. Once testing system 100 determines that changes have been made to source code file 108c, it extracts the changes to identify components impacted by the changes. Testing system 100 uses the code changes and code-to-feature mappings based on folder hierarchy in repository 102 to identify the product features related to the code changes. The code-to-feature mappings may include dependency tree 114, which may relate source code files 108, source code folders 110, product features, and product components. ML algorithm 112 determines one or more dependent product features impacted by the code change. In some examples, ML algorithm 112 gathers information from the product feature associated with the code change and from knowledge base 116 to determine one or more dependent product features impacted by the code change. Knowledge base 116 includes information and analysis from previous code changes and testing runs, including analysis based on tokenization of the code base, stemming, lemmatization, and stop words. In some examples, ML algorithm 112 uses dependency tree 114 to map the dependencies between features, components and products and determines the dependent product features based on relationships captured in dependency tree 114. In certain examples, ML algorithm 112 identifies a test gap based on information in the knowledge base indicating there are insufficient test cases to cover a certain product feature or product component. In some examples, testing system 100 notifies a user of the test gap. In some other examples, testing system 100 automatically generates a subset of test cases to fill the test gap based on the associated product feature and the one or more dependent product features.

Testing system 100 selects a relevant set of test cases from test repository 118 based on the associated product feature and the dependent product features. A first subset of the test cases test the associated product feature. A second subset of the test cases test dependent product features. The testing system then executes the selected set of test cases.

Upon execution of the set of test cases, ML algorithm 112 updates the code-to-feature mapping using results of execution of the set of test cases. In some examples, ML algorithm 112 updates knowledge base 116 with information from the set of test cases. In certain examples, ML algorithm 112 retrains on the updated knowledge base 116 to improve accuracy of determining dependent product features for the next code change. ML algorithm 112 may use pre-processing statements and libraries in the source code to update the code-to-feature mapping.

Figure 2:
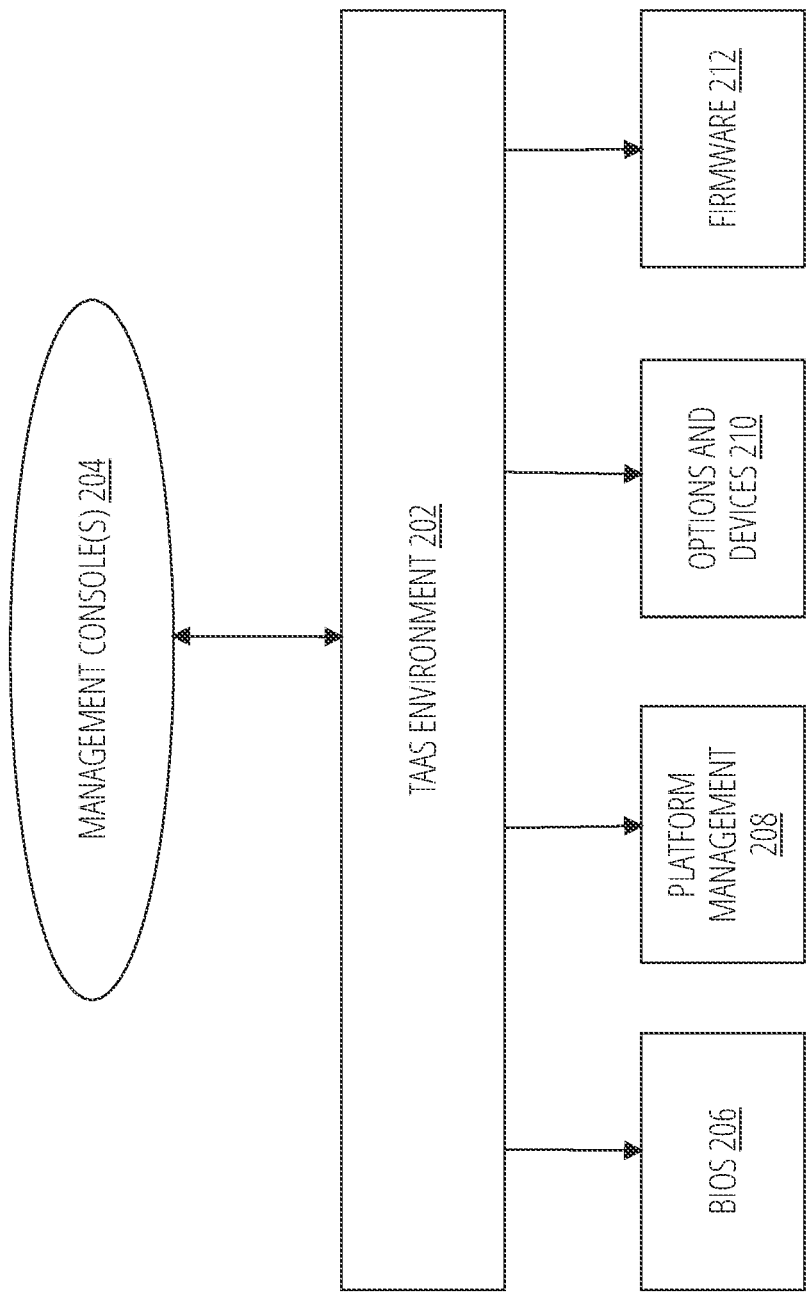
FIG. 2 is a block diagram of architecture for testing system-level code using a Testing as a Service (TaaS) environment.

FIG. 2 is a block diagram of architecture for testing system-level code using a Testing as a Service (TaaS) environment. The architecture of FIG. 2 is based around TaaS environment 202, which provides the functionality of TaaS environment 102 described with respect to FIG. 1. Management console(s) 204 provides one or more interfaces (e.g., graphical user interfaces, APIs, etc.) to allow engineers associated with code development to have access to the code being developed and the corresponding test environment. TaaS environment 202 and management console(s) 204 can be provided by the same cloud-based environment, for example, or TaaS environment 202 and management console(s) 204 can be interconnected by various network connections.

TaaS environment 202 interacts with various downstream components including, for example, BIOS 206, platform management 208, 210 and/or firmware 212. BIOS 206 represents a basic input/output system (BIOS) for one or more computing platforms that provides runtime services for operating systems of the host computing platform and can provide initialization services for the host computing platform. Platform management 208 represents one or more platform management agents (which can be hardware, software or a combination thereof) that reside on a host computing platform to provide system management and control of various components of the host computing system.

Options and devices 210 represents various devices that can be supported by host computing platforms that can provide additional functionality for the host computing platform as well as various optional combinations of devices that can be supported. Firmware 212 represents hardware-specific low-level software the provides supporting functionality for higher-level software entities.

TaaS environment 202 operates as described above to test code. Various components of TaaS environment 202 interact with the downstream components to determine dependencies involving the downstream components for use in selecting test suites to be executed on the code under development. Thus, TaaS environment 202 generates the test suites based on dependencies of the code and associated software components as well as downstream components for the target platform where the software under development will eventually operate.

Figure 3:
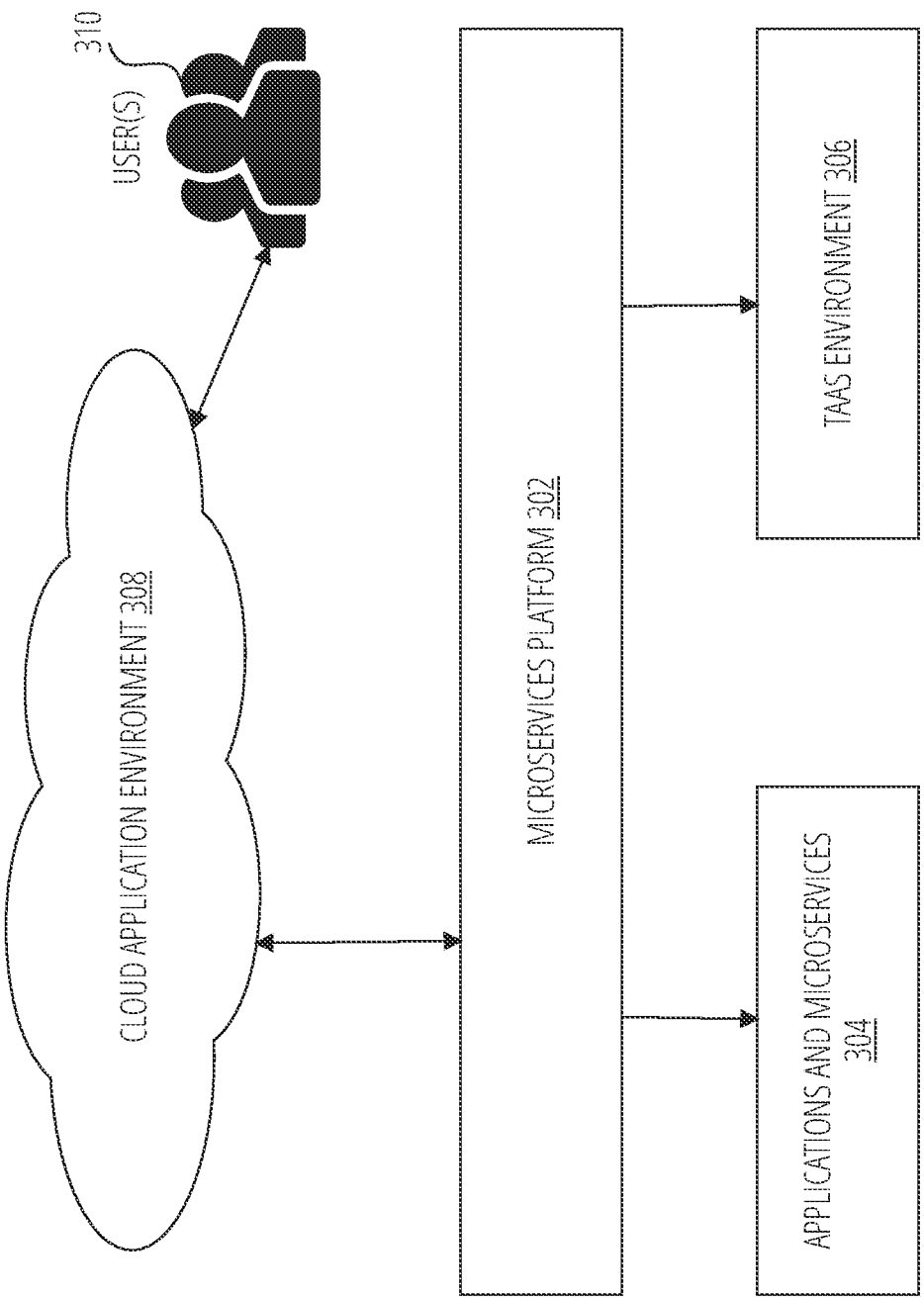
FIG. 3 is a block diagram of architecture for microservices code using a TaaS environment.

FIG. 3 is a block diagram of architecture for microservices code using a TaaS environment. In the example of FIG. 3, microservices platform 302 utilizes the functionality of TaaS environment 306 (which can operate as TaaS environment 102 described in FIG. 1) to test microservices code. Microservices generally refer to a software entity that performs a specified service (or set of services) and can be combined with other microservices to provide an application. Microservices are typically use in cloud-based environments in which flexibility and customization are desired. Microservices can be based on business rule and/or business functionality, for example.

Cloud application environment 308 represents the upstream environment in which microservices can be assembled into cloud applications and accessed by user(s) 310. Microservices platform 302 assembles one or more microservices and/or applications (e.g., applications and microservices 304) to provide the desired application functionality. Further, microservices platform 302 use the testing functionality of TaaS environment 306 to test code corresponding to individual applications and microservices 304 and/or combinations of applications and microservices.

Figure 4:
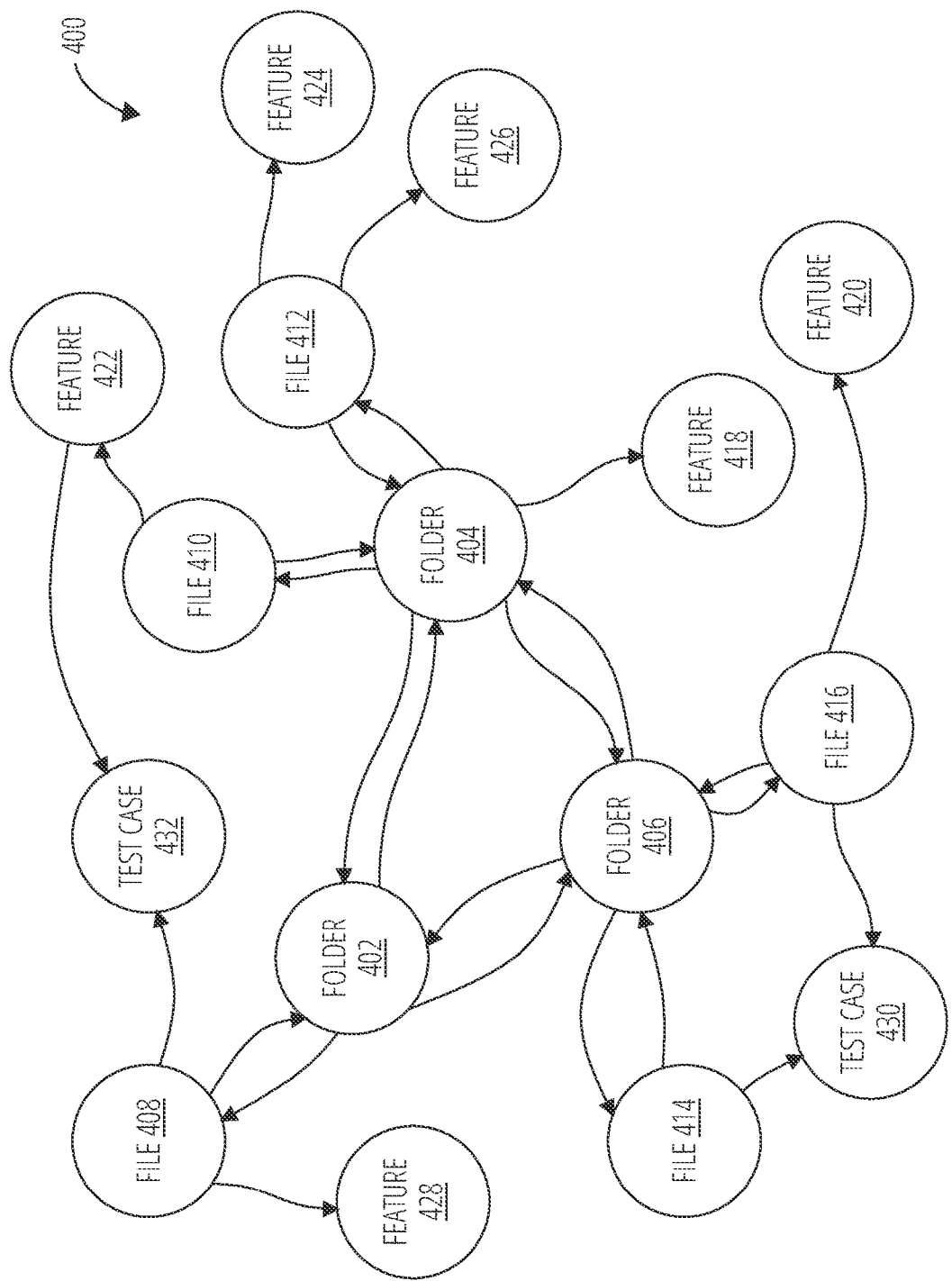
FIG. 4 is a conceptual illustration of nodes within a graph database for use within a TaaS environment.

FIG. 4 is a conceptual illustration of nodes within a graph database for use within a TaaS environment. The starting nodes for the graph represent one or more folders (e.g., folder 402, folder 404, folder 406). The folders have parent and child relationships with each other (e.g., as indicated by arrows linking in both directions between the folders).

The nodes of graph 400 represents some of the various components that can be affected by code changes within a file. Graph 400 is an example of the type of graph that is maintained in a graph database (e.g., graph database 122) and provides the basis for AI/ML analysis of the dependencies represented by graph 400. For example, a dependency tree (e.g., dependency tree 124) can be generated using graph 400. Code-to-feature mappings may be incorporated in graph 400, which may be displayed to a user in a graph visualization.

Folders contain one or more files. For example, folder 402 can contain file 408, folder 404 can contain file 410 and file 412, and folder 406 can contain file 414 and file 416. The folders can have parent and child relationships with the files (e.g., as indicated by arrows linking in both directions between the folders). Folders can also contain features. For example, file 408 can contain feature 428 and folder 404 can contain 418 (e.g., as indicated by arrows from the file to the feature). For example, file 410 can contain feature 422, file 412 can contain feature 424 and 426, and file 416 can contain feature 420.

The example of FIG. 4 is a simple example of the type of graph that can be constructed a dependency engine or dependency evaluator (e.g., dependency evaluator 108) and/or maintained in the graph database (e.g., graph database 122). The relationships of the elements in the graph can be used to track and analyze dependencies that are used to select test cases to build a test suite within a TaaS environment (e.g., TaaS environment 102, TaaS environment 202, TaaS environment 306).

In an example, links between nodes in the graph provide relationship information, which can be maintained in the graph database. Links between folders, files and/or features and corresponding test cases can also be determined and maintained in the graph database to streamline subsequent testing and generation of test suites. For example, file 414 and file 416 can be linked to test case 430. Similarly, file 408 and feature 422 can be linked to test case 432.

Figure 5:
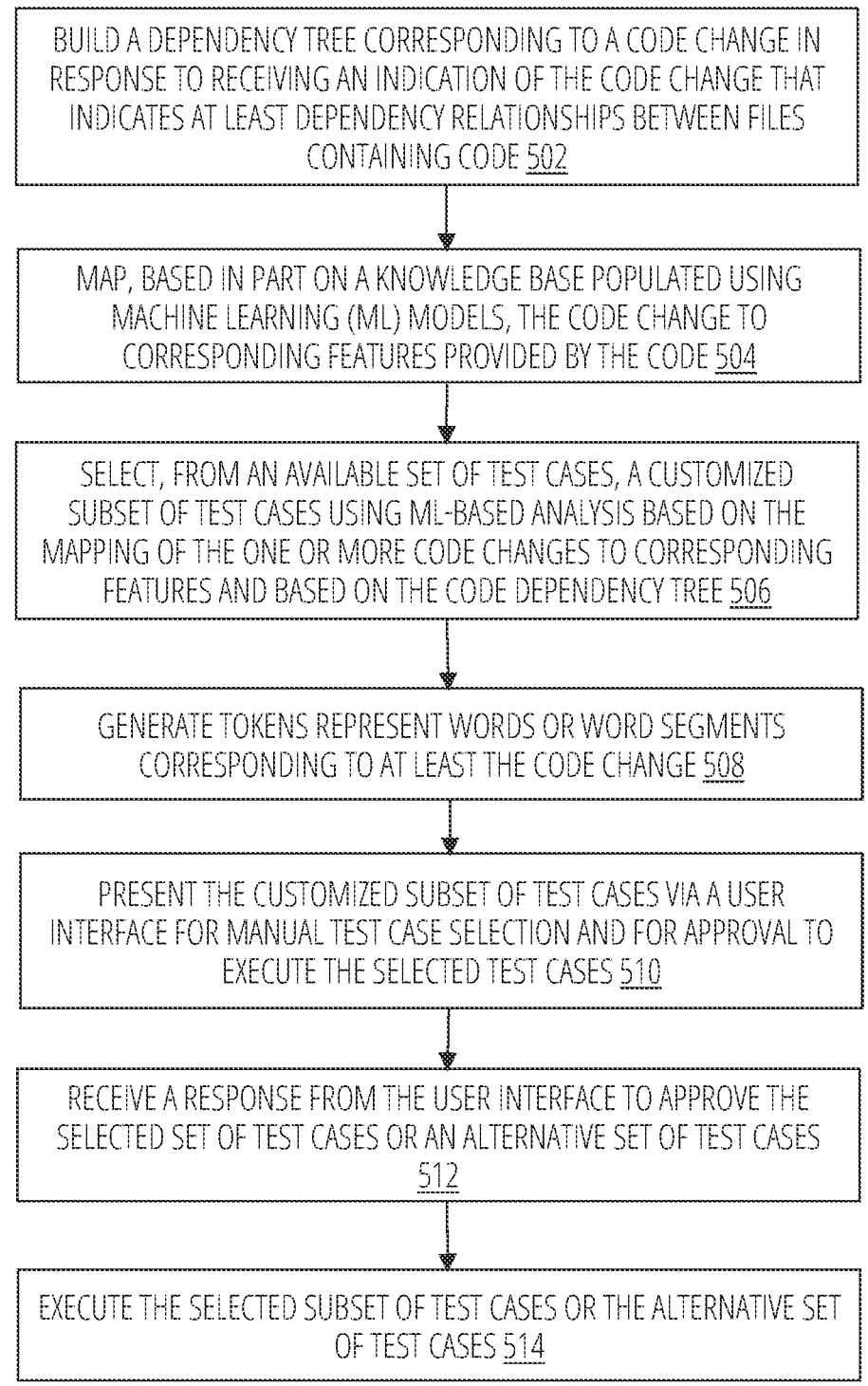
FIG. 5 is a flow diagram for one example technique for context-based test suite generation.

FIG. 5 is a flow diagram for one example technique for context-based test suite generation. The functionality described with respect to FIG. 5 can be provided by a TaaS environment (e.g., TaaS environment 102, TaaS environment 202, TaaS environment 306).

One or more components within a TaaS environment (e.g., dependency evaluator 108) build a dependency tree corresponding to a code change within a source code file in response to receiving an indication of the code change, 502. In an example, code analysis is performed by a code crawler or other component capable of parsing the updated code and a graph is maintained in a graph database that provides the basis for the dependency tree. New dependency trees can be built or existing dependency trees can be updated.

One or more components within the TaaS environment (e.g., dependency evaluator 108) use a knowledge base to map the code change to a corresponding feature provided by the code, 504. In an example, the knowledge base stores information related to keywords, features, relationships, etc. This information can be gathered from the current code changes being tested and/or information from previous code changes and tests can be maintained. Information from the knowledge base is used to determine what features are affected by the code changes, which can assist in determining what test cases to use.

A customized subset of test cases is selected from an available set of relevant test cases, where the selection is based on the knowledge base mapping of the code changes to corresponding features and on the code dependency tree, 506. By using the relationship information describing the features as well as other information from the code analysis and/or modeling, a subset of test cases that can potentially be well-suited for the specific code changes being analyzed is selected. Because of the analysis and knowledge utilized the testing process may be more efficient and less time-consuming than would otherwise be possible.

Various mapping techniques can be used including using key words from the source code being parsed and mapping the code to other files using ML learning techniques and the graph maintained in the knowledge base. This technique can also be used for firmware-based code bases and microservices-based code bases. The mapping can be used to assess the impact between components within the product as well as with downstream or upstream components.

As discussed above, the knowledge base is built based on text analysis, text analytics and text classifier techniques using, for example, tokens that represent words or word segments within the code files. In an example, the tokens can be used by one or more ML models to determine a decision and present a corresponding match of features based on the pattern and map the pattern to a feature under test. Additionally, deep learning techniques such as, for example, ANNs can also be used to improve accuracy.

Tokens can be generated corresponding to the code change that can be used in a machine learning model to match one or more features to the code change, 508. Use of machine learning techniques can provide an additional layer of intelligence to the testing process and can result in a better selection of test cases to be used than may otherwise be possible.

The customized subset of test cases is presented via a user interface that provides mechanisms for approval for execution or for further test case selection with respect to the customized subset of test cases, 510.

A response is received from the user interface indicating whether the presented customized subset of test cases has been approved or if an alternative set of test cases should be used, 512. The customized subset of test cases or the alternative set of test cases is executed based on the response from the user interface, 514.

Figure 6:
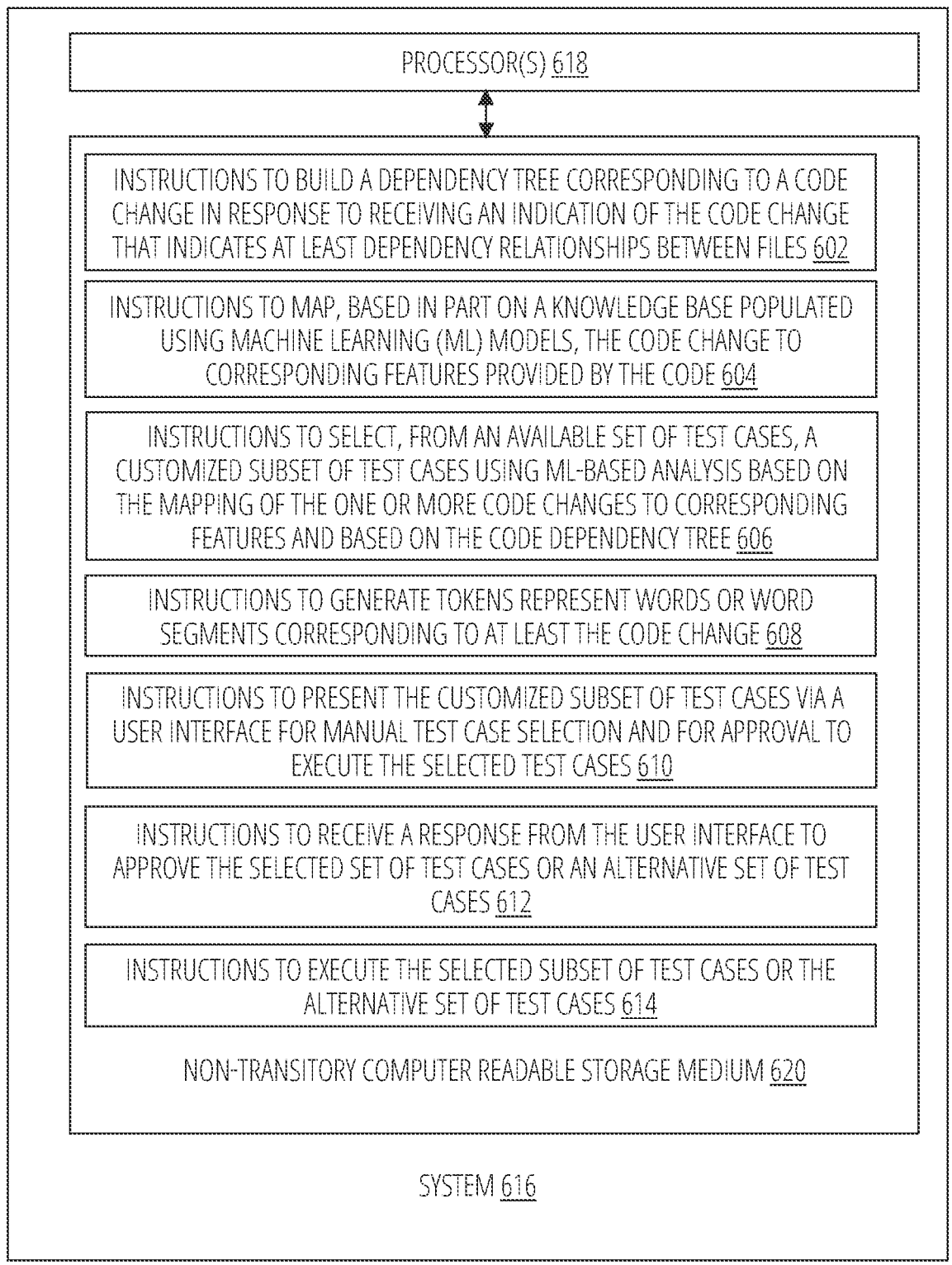
FIG. 6 is a block diagram of one example of a processing system that can provide context-based test suite generation.

FIG. 6 is a block diagram of one example of a processing system that can provide context-based test suite generation. In an example, system 616 can include processor(s) 618 and non-transitory computer readable storage medium 620. Non-transitory computer readable storage medium 620 may store instructions 602, 604, 606, 608, 610, 612 and 614 that, when executed by processor(s) 618, cause processor(s) 618 to perform various functions. Examples of processor(s) 618 may include a microcontroller, a microprocessor, a central processing unit (CPU), a graphics processing unit (GPU), a data processing unit (DPU), an application-specific integrated circuit (ASIC), an field programmable gate array (FPGA), a system on a chip (SoC), etc. Examples of a non-transitory computer readable storage medium 620 include tangible media such as random access memory (RAM), read-only memory (ROM), electrically erasable programmable read-only memory (EEPROM), flash memory, a hard disk drive, etc.

Instructions 602 cause processor(s) 618 to build a dependency tree corresponding to a code change within a source code file in response to receiving an indication of the code change. In an example, code analysis is performed by a code crawler or other component capable of parsing the updated code and a graph is maintained in a graph database that provides the basis for the dependency tree. New dependency trees can be built or existing dependency trees can be updated.

Instructions 604 cause processor(s) 618 to use a knowledge base to map the code change to a corresponding feature provided by the code. In an example, the knowledge base stores information related to keywords, features, relationships, etc. This information can be gathered from the current code changes being tested and/or information from previous code changes and tests can be maintained. Information from the knowledge base is used to determine what features are affected by the code changes, which can assist in determining what test cases to use.

Instructions 606 cause processor(s) 618 to select a customized subset of test cases from an available set of relevant test cases, where the selection is based on the knowledge base mapping of the code changes to corresponding features and on the code dependency tree, 506. By using the relationship information describing the features as well as other information from the code analysis and/or modeling, a subset of test cases that can potentially be well-suited for the specific code changes being analyzed is selected.

Various mapping techniques can be used including using key words from the source code being parsed and mapping the code to other files using ML learning techniques and the graph maintained in the knowledge base. This technique can also be used for firmware-based code bases and microservices-based code bases. The mapping can be used to assess the impact between components within the product as well as with downstream or upstream components.

As discussed above, the knowledge base is built based on text analysis, text analytics and text classifier techniques using, for example, tokens that represent words or word segments within the code files. In an example, the tokens can be used by one or more ML models to determine a decision and present a corresponding match of features based on the pattern and map the pattern to a feature under test. Additionally, deep learning techniques such as, for example, ANNs can also be used to improve accuracy.

Instructions 608 cause processor(s) 618 to generate tokens corresponding to the code change that can be used in a machine learning model to match one or more features to the code change. Use of machine learning techniques can provide an additional layer of intelligence to the testing process and can result in a better selection of test cases to be used than may otherwise be possible.

Instructions 610 cause processor(s) 618 to present the customized subset of test cases via a user interface that provides mechanisms for approval for execution or for further test case selection with respect to the customized subset of test cases.

Instructions 612 cause processor(s) 618 to receive a response from the user interface indicating whether the presented customized subset of test cases has been approved or if an alternative set of test cases should be used. Instructions 614 cause processor(s) 618 to execute the customized subset of test cases or the alternative set of test cases based on the response from the user interface, 514.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 620 has stored thereon data representing sequences of instructions that, when executed by a processor(s) 618, cause the processor(s) 618 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A system comprising:
processing circuitry; and
a memory coupled with the processing circuitry, the memory storing instructions that, when executed by the processing circuitry cause the system to:
   detect a code change to source code included in a code repository;
   identify, based on a code-to-feature mapping, a relationship between the code change to the source code and an associated product feature;
   determine, using a machine learning (ML) algorithm and based on the associated product feature, one or more dependent product features impacted by the code change to the source code;
   select, based on the associated product feature and the one or more dependent product features, a set of test cases including a subset of test cases related to the associated product feature and a subset of test cases related to the one or more dependent product features;
   execute the set of test cases; and
   update, using the ML algorithm, the code-to-feature mapping using results of executing the set of test cases.

2. The system of claim 1 wherein the code-to-feature mapping includes a dependency tree that relates source code, source code folders, product features, and product components.

3. The system of claim 2 wherein the ML algorithm updates the code-to-feature mapping by updating the dependency tree using pre-processing statements and libraries in the source code.

4. The system of claim 1 wherein the ML algorithm identifies the relationship between the code change to the source code and the associated product feature based on a knowledge base including information from prior testing.

5. The system of claim 4 wherein the knowledge base includes one or more of: tokenizations of the source code, stemmings, lemmatizations, or stop words.

6. The system of claim 4 wherein the ML algorithm identifies a test gap based on information in the knowledge base indicating there are insufficient test cases to cover a certain product feature or product component.

7. The system of claim 1 wherein the set of test cases includes a subset of test cases automatically generated based on the associated product feature and the one or more dependent product features.

8. A non-transitory computer-readable storage medium having stored thereon instructions that, when executed by a processor, cause the processor to:
   detect a code change to source code included in a code repository;
   identify, using a machine learning (ML) algorithm and based on a code-to-feature mapping, a relationship between the code change to the source code and an associated product feature, wherein the code-to-feature mapping includes a dependency tree that relates source code, source code folders, product features, and product components;
   determine, based on the associated product feature, one or more dependent product features impacted by the code change to the source code;
   select, based on the associated product feature and the one or more dependent product features, a set of test cases including a subset of test cases related to the associated product feature and a subset of test cases related to the one or more dependent product features;
   execute the set of test cases; and
   update, using the ML algorithm, the code-to-feature mapping using results of executing the set of test cases.

9. The non-transitory computer-readable storage medium of claim 8 wherein the ML algorithm updates the code-to-feature mapping by updating the dependency tree using pre-processing statements and libraries in the source code.

10. The non-transitory computer-readable storage medium of claim 8 wherein the ML algorithm identifies the relationship between the code change to the source code and the associated product feature based on a knowledge base including information from prior testing.

11. The non-transitory computer-readable storage medium of claim 10 wherein the knowledge base includes one or more of: tokenizations of the source code, stemmings, lemmatizations, or stop words.

12. The non-transitory computer-readable storage medium of claim 10 wherein the ML algorithm identifies a test gap based on information in the knowledge base indicating there are insufficient test cases to cover a certain product feature or product component.

13. The non-transitory computer-readable storage medium of claim 8 wherein the set of test cases includes a subset of test cases automatically generated based on the associated product feature and the one or more dependent product features.

14. The non-transitory computer-readable storage medium of claim 8 wherein the code-to-feature mapping is displayed to a user in a graph visualization.

15. A method comprising:
   detecting a code change to source code included in a code repository;
   identifying, using a machine learning (ML) algorithm and based on a code-to-feature mapping, a relationship between the code change to the source code and an associated product feature, wherein the code-to-feature mapping includes a dependency tree that relates source code, source code folders, product features, and product components, and wherein the ML algorithm identifies the relationship between the code change to the source code and the associated product feature based on a knowledge base including information from prior testing;

determining, based on the associated product feature, one or more dependent product features impacted by the code change to the source code;

selecting, based on the associated product feature and the one or more dependent product features, a set of test cases including a subset of test cases related to the associated product feature and a subset of test cases related to the one or more dependent product features;

executing the set of test cases; and updating, using the ML algorithm, the code-to-feature mapping using results of executing the set of test cases.

16. The method of claim 15 wherein the ML algorithm updates the code-to-feature mapping by updating the dependency tree using pre-processing statements and libraries in the source code.

17. The method of claim 15 wherein the knowledge base includes one or more of: tokenizations of the source code, stemmings, lemmatizations, or stop words.

18. The method of claim 15 wherein the set of test cases includes a subset of test cases automatically generated based on the associated product feature and the one or more dependent product features.

19. The method of claim 15 wherein the ML algorithm identifies a test gap based on information in the knowledge base indicating there are insufficient test cases to cover a certain product feature or product component.

20. The method of claim 19 further comprising updating the knowledge base in response to the identification of the test gap.

* * * * *